Jan. 5, 1932.　　E. L. CONNELL　　1,839,648
PORTABLE MOTOR DRIVEN SCREW DRIVER
Filed March 20, 1931
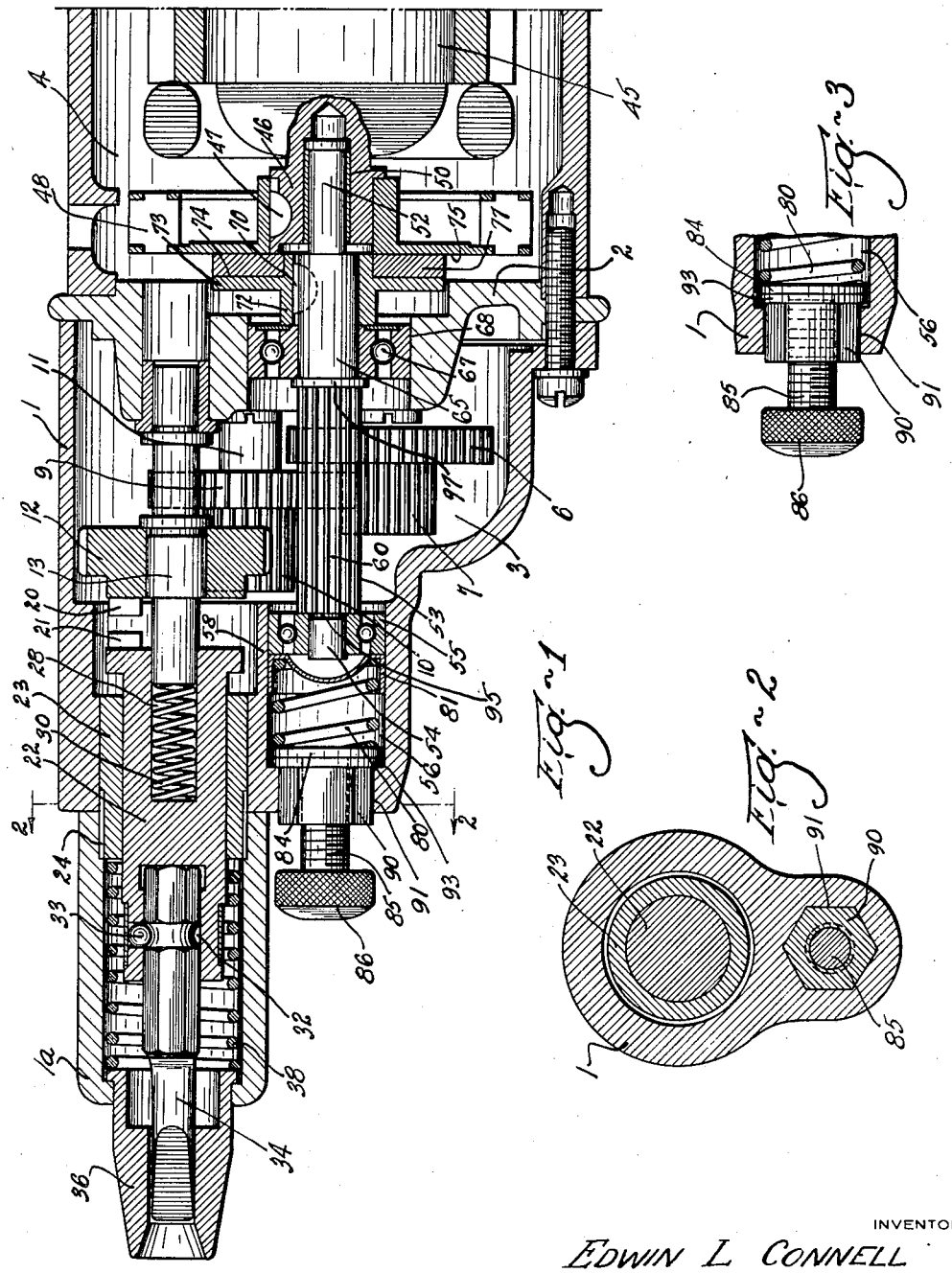
INVENTOR
EDWIN L. CONNELL
BY
ATTORNEYS Patented Jan. 5, 1932

1,839,648

UNITED STATES PATENT OFFICE

EDWIN L. CONNELL, OF TOWSON, MARYLAND, ASSIGNOR TO THE BLACK & DECKER MANUFACTURING COMPANY, OF TOWSON, MARYLAND, A CORPORATION OF MARYLAND

PORTABLE MOTOR DRIVEN SCREW DRIVER

Application filed March 20, 1931. Serial No. 524,195.

This invention relates to improvements in portable, motor-driven screw drivers and more particularly, in screw drivers having friction clutch means in the driving connections between their motors and their tool-carrying spindles.

The general object of the present invention is the provision of an improved screw driver of the type mentioned, which screw driver is of compact and easy-to-handle form, of simple and inexpensive construction, of strong and sturdy character, and of exceptional efficiency in use.

A more specific object of the present invention is the provision of an improved screw driver of the type mentioned which is suitable for use in setting screws in wood as well as in metal.

In setting screws in metal, the two cooperating friction clutch members in the tool driving connections can be given one predetermined degree of frictional driving engagement which is sufficient to properly drive home all screws. In setting screws in wood, however, all screws can not be properly driven home by giving the friction clutch members in the tool driving connections one particular degree of frictional driving engagement. Some screws will encounter exceptionally hard portions of the wood, and an additional degree of frictional driving engagement of said clutch members will be necessary for those screws.

The present improved screw driver is therefore provided with one operator adjustable means for giving the friction clutch members of the tool driving connections that particular degree of frictional driving engagement sufficient to drive home all screws in metal and that particular degree of frictional driving engagement sufficient to drive home most screws in wood, and is also provided with a second operator-operable means, effective upon said first means, for temporarily increasing the degree of frictional driving engagement of said clutch members, whereby the remaining screws (those entering exceptionally hard portions of the wood) can be properly driven home.

While said second means is effective upon the first means, the adjustment of said first means is not disturbed by operation of said second means, a most important feature of the present invention.

Further features of the present invention are in part obvious and in part will appear more in detail hereinafter.

The invention will be readily understood from the following description thereof, reference being had to the accompanying drawings in which Fig. 1 is a central longitudinal sectional view of that portion of a portable, motor-driven screw driver which embodies the present invention; Fig. 2 is a cross-sectional view thereof on the line 2—2, Fig. 1; and Fig. 3 is a detail longitudinal sectional view of the two means of the present tool for controlling the degree of frictional driving engagement of the tool clutch members, said means being shown in position for giving said clutch members an increased degree of frictional driving engagement.

As indicated in the drawings, the present improved screw driver includes a suitable metal housing 1, of generally cylindrical shape, and provided intermediate its ends with a cross wall 2 dividing the space within said housing into a front chamber 3 and a rear chamber 4.

Within the housing front chamber 3 is arranged the gearing of the tool driving connections, said gearing including a gear 6 and a pinion 7 both mounted on a suitable jack shaft (not shown); a gear 9 and a pinion 10 both mounted on a suitable jack shaft 11, the gear 9 meshing with and adapted to be driven by the pinion 7; and a gear 12 mounted on a suitable jack shaft 13 and meshing with and adapted to be driven by the pinion 10.

The gear 12 is provided on its front face with a forwardly extending tooth 20 adapted for driving engagement with a rearwardly extending tooth 21 on the rear face of the enlarged end of the tool spindle 22. Said spindle is slidably mounted in a suitable bushing 23 keyed at 24 or otherwise non-rotatably mounted in the front end portion of the tool housing 1. In the rear end of said spindle is a longitudinally disposed, generally cylindrical cavity 28 into the rear end portion of which extends, for journalling purposes, the front end portion of the jack shaft 13 on which the spindle driving gear 12 is mounted. Arranged within the spindle cavity 28, with its rear end abutting the front end of said jack shaft 12 and its front end abutting the cavity bottom or front wall is a compression spring 30, the purpose of which is to normally move the spindle forwardly and hence out of interlocking engagement with the spindle driving gear 12.

In the front end of the spindle 22 is a longitudinally disposed cavity 32 within which is suitably secured, such as by a ball 33, the rear end portion of a screw driver blade 34.

To facilitate the entry of the screw driver blade 34 into the slots of screws in use of the tool, a tubular finder 36 is provided. Normally, said finder lies in the advanced position shown in Fig. 1, said finder being maintained in such position by a compression spring 38. Said spring lies within a tubular front extension 1a of the tool housing 1, and surrounds the rear end portion of the screw driver blade 24 and the front end portion of the tool spindle 22. The front end of said spring abuts the enlarged rear end of the finder 36 (said end being enlarged to confine it in the housing extension 1a) and the rear end of said spring abuts the front end of the bushing 23 in which the tool spindle is slidably mounted.

In the use of the tool, the finder 36 alone and then said finder and the screw driver blade 34 together are pushed rearwardly by their engagement with the object into which the screws are to be driven. The spindle 22, in which the screw driver blade 34 is mounted, moves rearwardly, of course, with said blade, such rearward movement being effected against the resistance of the compression spring 30 arranged within the tool spindle cavity 28. Rearward movement of the finder 36 is effected against the resistance of compression spring 38 lying within the housing front extension 1a.

Sufficient rearward movement of the screw driver blade 34 and the spindle 22 effects driving engagement of the gear 12 with said spindle, through the instrumentality of the teeth 20, 21, and said spindle and said screw driver blade are thus driven by said gear, all as will be readily understood.

Arranged within the housing rear chamber 4 is a suitable electric motor 45 having a forwardly extending armature shaft 46 on the front end portion of which is keyed at 47 or otherwise suitably mounted a fan 48 for cooling those parts of the tool located in this rear chamber 4. Suitably journalled in a cavity 50 in the front end portion of the armature shaft 46 is the reduced rear end portion 52 of a longitudinally disposed and longitudinally movable shaft 53 having its reduced front end portion 54 suitably journalled in a ball bearing device 55.

Said bearing device is slidably mounted in the rear end portion of a small, cylindrical secondary chamber 56 in the front end of the tool housing 1, said secondary chamber opening at its rear end into the main front chamber 3 of the tool housing 1 and being formed by an arcuate shaped wall portion 58 preferably formed integral with said tool housing.

Adjacent its reduced front end 53 and for an appreciable portion of its length, the longitudinally movable shaft 53 is provided with or is formed as an elongated pinion 60, and said pinion meshes with and is adapted to drive the gear 6 of the gearing heretofore described. Because of its extended length, said pinion 60 is at all times in mesh with gear 6.

The shaft 53, between its pinion 60 and its reduced rear end portion 52, is provided with a plain cylindrical portion 65, the front part of which is supported in a ball bearing device 67 mounted in a suitable opening 68 in the housing cross wall 2. On the rear part of this plain shaft portion 65 is keyed at 70 or otherwise non-rotatably mounted the hub portion 72 of a suitable friction clutch member 73, the rear face 74 of which constitutes its friction clutch face. The front face 75 of the ventilating fan 48 constitutes the friction clutch face for cooperative engagement with the friction clutch face 74 of the shaft friction clutch member, and if desired and as shown, a yielding member 77 of leather or the like may be interposed between said two cooperating clutch faces 74, 75.

Inasmuch as one of said friction clutch faces, namely, face 74, is mounted on and movable with the longitudinally movable shaft 53, it follows that the longitudinal position of said shaft determines not only whether said clutch faces are in engagement, but also, if they are, the degree of their engagement. Therefore, to produce frictional driving engagement of the clutch faces 74, 75, engagement of any desired degree, the shaft 53 is longitudinally moved rearwardly. For producing such movement of said shaft, a compression spring 80 is arranged in the small, secondary chamber 56 at the front of the main front chamber 3. The rear end of said spring is provided with a suitable metal cap 81 which engages the ball bearing device 55 in which is mounted the front end portion 54 of shaft 53. The front end of spring 80 engages the headed or flanged rear end 84 of an adjusting screw 85 having its knurled operating head 86 lying outside the tool housing for convenient manipulation by the tool operator.

Said adjusting screw 85, instead of being mounted directly in the tool housing, is threaded in a nut-like member 90 slidably but non-rotatably mounted in an opening 91 in the tool housing, said nut-like member being here shown as of hexagonal shape. Said nut-like member is provided at its inner end with an outwardly extending annular flange or head 93 by means of which said member is confined in said housing opening 91, at least so far as forward movement of said member is concerned. Inasmuch as the adjusting screw 85 is threaded in said nut-like member and inasmuch as the front end of spring 80 engages the rear end of said adjusting screw, said nut-like member is normally maintained by said spring in its outermost position, as in Fig. 1, with its inner flange or head 93 in engagement with the tool housing.

From the foregoing, it will be obvious that rearward movement of shaft 53 is produced, and frictional driving engagement of the clutch faces 74, 75 thereby effected, by the compression spring 80 acting upon the bearing device 55 which in turn acts on an annular shoulder 95 of shaft 53 at the rear of its reduced front end portion 54.

The shaft 53, through its collar 97, acts on the bearing device 68 which in turn engages the hub portion 72 of the friction clutch member 73. The effect of spring 80 upon shaft 53, and hence upon the clutch faces 74, 75, is normally controlled by adjustment of the screw 85 within the sliding nut-like member 90 which, as before mentioned, is normally maintained by the spring 80 in its outermost position, as in Fig. 1.

By simply adjusting the screw 85 with respect to the nut-like member 90 in which it is mounted, the friction clutch faces 74, 75 (which faces operatively connect the tool motor 45 and the tool screw driver blade 34) may be given any desired degree of frictional driving engagement. In setting screws in metal, the tool operator, by adjustment of screw 85, gives said clutch faces that particular degree of frictional driving engagement just sufficient to properly drive the screws home. Proper setting of said screws in the metal is thereby insured, because after the "home" positions of said screws are reached, the clutch faces slip and no further driving effect is imparted to the tool screw driver blade 34.

While one predetermined degree of frictional driving engagement of the tool clutch faces is sufficient to properly drive home all screws in metal, it has been found that in setting screws in wood, one predetermined degree of frictional driving engagement of the tool clutch members is usually not sufficient. A few of the screws usually encounter exceptionally hard portions of the wood and such screws cannot be fully driven home by that degree of frictional driving engagement of the clutch faces which is sufficient for the rest of the screws. For these few screws, therefore, the degree of friction driving engagement of the lutch faces must be increased in order to enable them to be properly driven home.

With the present tool, an increase in the degree of frictional driving engagement of the clutch faces is readily effected by simply moving inwardly, as a unit, the adjusting screw 85 and the sliding nut 90 in which it is mounted. Such inward movement (rearward movement as viewed in Figs. 1 and 3) of said adjusting screw and said nut-like member further compresses the spring 80 and causes said spring to give the clutch faces the necessary increase of frictional driving engagement sufficient to properly drive home any particular screw. The amount of increase in the degree of frictional driving engagement of the clutch faces depends, of course, upon the degree to which the spring 80 is compressed and that depends, of course, upon the amount of inward movement of the adjusting screw 85 and the nut-like member 90 in which it is mounted.

In setting screws in wood, the friction clutch faces 74, 75 are given, by proper adjustment of the screw 85, that degree of frictional driving engagement which is sufficient to properly drive home the average screw, or in other words, most of the screws. When a screw is encountered which cannot be fully driven home by the degree of frictional driving engagement given the clutch faces by the adjustment of screw 85, the operator temporarily increases, to the necessary extent, the degree of frictional driving engagement of the clutch faces by simply moving inwardly, as a unit, the adjusting screw 85 and the nut-like member 90 in which it is mounted. The resultant increase in compression of spring 80 effects the necessary increase in the degree of frictional driving engagement of the clutch faces and permits that screw to be easily and quickly driven home. When said screw has been driven home, the operator simply releases the pressure on the operating head 86 of the adjusting screw 85 and the spring 80 returns said screw and the nut-like member 90 in which it is mounted to their former position, with the inner head of said nut-like member in engagement with the tool housing. The degree of frictional driving engagement of the tool clutch faces has therefore been temporarily increased without changing or disturbing the normal seating or adjustment of screw 85, so that the tool remains or is again in proper condition for driving home the average screw.

What I claim is:

1. In a portable, motor driven screw driver, a tool-carrying spindle, a motor, driving connections therebetween and including a pair of cooperating friction clutch parts, spring means for exerting a pressure-producing effect on one of said clutch parts to thereby bring about frictional driving engagement of said clutch parts, a housing carrying the aforementioned elements, adjustable control means for controlling the pressure-producing effect of said spring means on said clutch part, said control means being adjustable by the tool operator from outside said housing, whereby said control means can be so adjusted as to cause said spring means to give said clutch parts a predetermined degree of frictional driving engagement sufficient to enable most screws to be properly driven home in any particular object, and operator operable means for increasing the pressure-producing effect of said spring means on said clutch part to thereby increase the degree of frictional driving engagement of said clutch parts, thereby enabling the remaining screws, those entering especially hard portions of said object, for example, to be properly driven home, the operation of said last named means being effected without disturbing the control means adjustment which is sufficient for most screws.

2. In a portable, motor driven screw driver, a tool-carrying spindle, a motor, driving connections therebetween and including a pair of cooperating friction clutch parts, spring means for exerting a pressure-producing effect on one of said clutch parts to thereby bring about frictional driving engagement of said clutch parts, a housing carrying the aforementioned elements, adjustable control means for controlling the pressure-producing effect of said spring means on said clutch part, said control means being adjustable by the tool operator from outside said housing, whereby said control means can be so adjusted as to cause said spring means to give said clutch parts a predetermined degree of frictional driving engagement sufficient to enable most screws to be properly driven home in any particular object, and means operable at will by the operator from outside said housing for increasing the pressure-producing effect of said spring means on said clutch part to thereby increase the degree of frictional driving engagement of said clutch parts, thereby enabling the remaining screws, those entering especially hard portions of said object, for example, to be properly driven home, the operation of said last named means being effected without disturbing the control means adjustment which is sufficient for most screws.

3. In a portable, motor driven screw driver, a tool-carrying spindle, a motor, driving connections therebetween and including a pair of cooperating friction clutch parts, spring means for exerting a pressure-producing effect on one of said clutch parts to thereby bring about frictional driving engagement of said clutch parts, a housing carrying the aforementioned elements, adjustable control means for controlling the pressure-producing effect of said spring means on said clutch part, said control means being adjustable by the tool operator from outside said housing, whereby said control means can be so adjusted as to cause said spring means to give said clutch parts a predetermined degree of frictional driving engagement sufficient to enable most screws to be properly driven home in any particular object, and means associated with said control means and operable at will by the operator from outside said housing for increasing the pressure-producing effect of said spring means on said clutch part to thereby increase the degree of frictional driving engagement of said clutch parts, thereby enabling the remaining screws, those entering especially hard portions of said object, for example, to be properly driven home, the operation of said last named means being effected without disturbing the control means adjustment which is sufficient for most screws.

4. In a portable, motor driven screw driver, a tool-carrying spindle, a motor, driving connections therebetween and including a pair of cooperating friction clutch parts, spring means for exerting a pressure-producing effect on one of said clutch parts to thereby bring about frictional driving engagement of said clutch parts, a housing carrying the aforementioned elements, supporting means mounted in said housing and movable inwardly at will by the tool operator, and means for controlling the pressure-producing effect of said spring means on said clutch part, said control means being adjustably mounted in said supporting means and being adjustable by the operator from outside said housing, whereby said control means is movable relative to said supporting means and also with said supporting means as a unit, the arrangement being such that by adjustment of said control means relative to said supporting means, said spring means can be caused to give said clutch parts a predetermined degree of frictional driving engagement sufficient to enable most screws to be properly driven home in any particular object and that by inward movement by the operator of said supporting means and said control means as a unit and at the operator's will, said spring means can be caused to give said clutch parts a greater degree of frictional driving engagement, thereby enabling the remaining screws, those entering exceptionally hard portions of said object, for example, to be properly driven home, such increase of the frictional driving engagement of said clutch parts being accomplished without disturbing the control means adjustment which is sufficient for most screws.

5. In a portable, motor driven screw driver, a tool-carrying spindle, a motor, driving connections therebetween and including a pair of cooperating friction clutch parts, spring means for exerting a pressure-producing effect on one of said clutch parts to thereby bring about frictional driving engagement of said clutch parts, a housing carrying the aforementioned elements, supporting means slidably but non-rotatably mounted in said housing for movement inwardly and outwardly with respect thereto, and control means engaging said spring means for controlling its pressure-producing effect on said clutch part, said control means being adjustably mounted in said supporting means and being adjustable by the operator from outside said housing, whereby said control means is movable relative to said supporting means and also with said supporting means as a unit, said supporting means being normally moved outwardly with respect to said housing by said spring means acting on said control means and being provided with means for limiting its outward movement with respect to said housing, the arrangement being such that by operator adjustment of said control means relative to said supporting means, said spring means can be caused to give said clutch parts a predetermined degree of frictional driving engagement sufficient to enable most screws to be properly driven home in any particular object, and that by inward movement by the operator of said supporting means and said control means as a unit and at the operator's will, said spring means can be caused to give said clutch parts a greater degree of frictional driving engagement, thereby enabling the remaining screws, those entering exceptionally hard portions of said object, for example, to be properly driven home, such increase of the frictional driving engagement of said clutch parts being accomplished without disturbing the control means adjustment which is sufficient for most screws.

6. In a portable, motor driven screw driver, a tool-carrying spindle, a motor, driving connections therebetween and including a pair of cooperating friction clutch parts, spring means for exerting a pressure-producing effect on one of said clutch parts to thereby bring about frictional driving engagement of said clutch parts, a housing carrying the aforementioned elements, supporting means slidably but non-rotatably mounted in said housing for movement inwardly and outwardly with respect thereto, and a set screw adjustably mounted in said supporting means and engaging said spring means for controlling its pressure-producing effect on said clutch part, said set screw being adjustable by the operator from outside said housing, whereby said set screw is movable relative to said supporting means and also with said supporting means as a unit, said supporting means being normally moved outwardly with respect to said housing by said spring means acting on said set screw, said supporting means being provided with means for limiting its outward movement with respect to said housing, the arrangement being such that by operator adjustment of said set screw relative to said supporting means, said spring means can be caused to give said clutch parts a predetermined degree of frictional driving engagement sufficient to enable most screws to be properly driven home in any particular object, and that by inward movement by the operator of said supporting means and said set screw as a unit and at the operator's will, said spring means can be caused to give said clutch parts a greater degree of frictional driving engagement, thereby enabling the remaining screws, those entering exceptionally hard portions of said object, for example, to be properly driven home, such increase of the frictional driving engagement of said clutch parts being accomplished without disturbing the set screw adjustment which is sufficient for most screws.

7. In a portable, motor driven screw driver, a tool-carrying spindle, a motor, driving connections therebetween and including a pair of cooperating friction clutch parts, spring means for exerting a pressure-producing effect on one of said clutch parts to thereby bring about frictional driving engagement of said clutch parts, a housing carrying the aforementioned elements, a nut slidably but non-rotatably mounted in said housing for movement inwardly and outwardly with respect thereto, and a set screw threaded and therefore adjustably mounted in said nut and engaging said spring means for controlling its pressure-producing effect on said clutch part, said set screw being adjustable by the operator from outside said housing, whereby said set screw is movable relative to said nut and also with said nut as a unit, said nut being normally moved outwardly with respect to said housing by said spring means acting on said set screw, said nut being provided with means for limiting its outward movement with respect to said housing, the arrangement being such that by operator adjustment of said set screw relative to said nut, said spring means can be caused to give said clutch parts a predetermined degree of frictional driving engagement sufficient to enable most screws to be properly driven home in any particular object, and that by inward movement by the operator of said nut and said set screw, said spring means can be caused to give said clutch parts a greater degree of frictional driving engagement, thereby enabling the remaining screws, those entering exceptionally hard portions of said object, for example, to be properly driven home, such increase of the frictional driving engagement of said clutch parts being accomplished without disturbing the set screw adjustment which is sufficient for most screws.

In testimony whereof I hereby affix my signature.

EDWIN L. CONNELL.